May 17, 1927.
J. F. CREGAN
1,628,952
TREATMENT OF FURNACE GASES TO RECOVER ZINC OXIDE
Filed Aug. 12, 1922
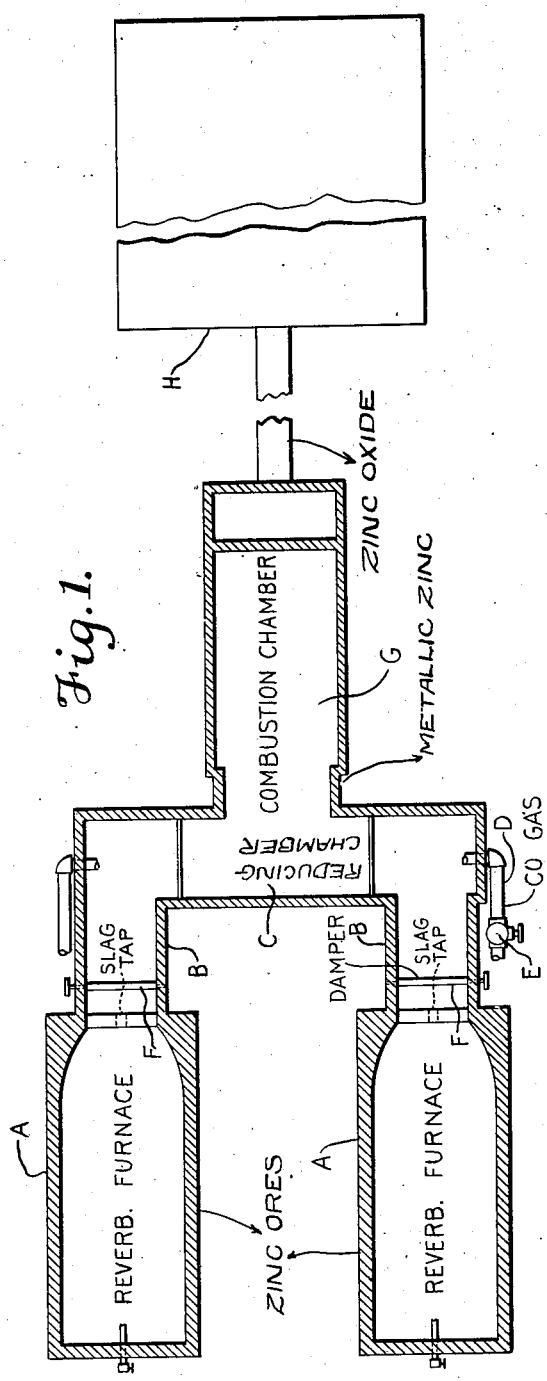
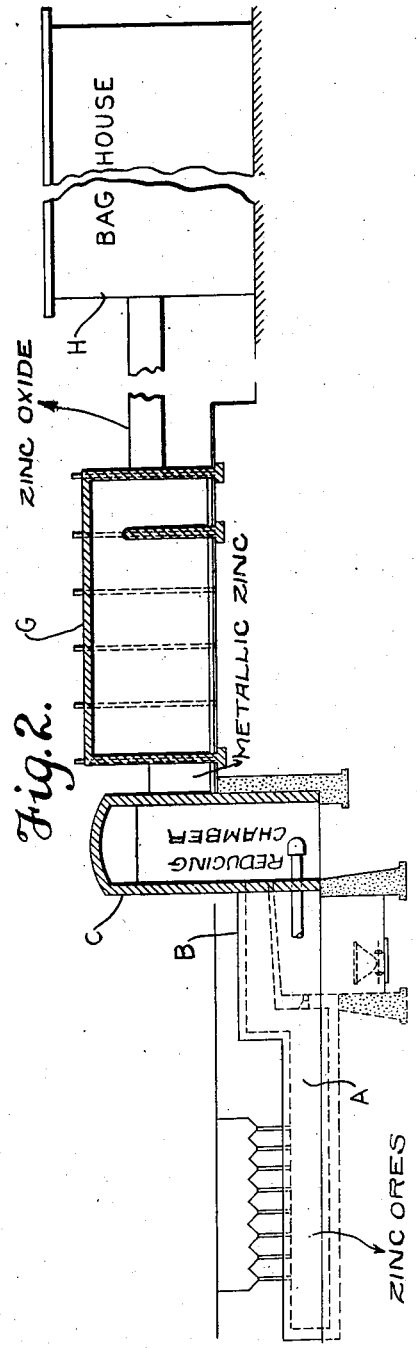
INVENTOR
John F. Cregan
BY Albert M. Austin
his ATTORNEY Patented May 17, 1927.

1,628,952

UNITED STATES PATENT OFFICE.

JOHN F. CREGAN, OF PUEBLO, COLORADO, ASSIGNOR TO AMERICAN SMELTING AND REFINING COMPANY, OF NEW YORK, N. Y., A CORPORATION OF NEW JERSEY.

TREATMENT OF FURNACE GASES TO RECOVER ZINC OXIDE.

Application filed August 12, 1922. Serial No. 581,331.

It is well understood that the commercial value of zinc oxide depends to a considerable extent on the color of the pigment and physical texture. Discoloration results from a great variety of causes, and heretofore a high grade commercial product has been obtained from zinc ores treated in large quantity in modern types of furnace, such as reverberatory furnaces, with difficulty and only under favorable conditions.

My process relates particularly to a method of treating the metallic fume from ores that are smelted under high temperatures in open types of furnace, such as reverberatory furnaces, so as to produce a product having a uniform color and tint.

The invention also relates to a method of recovering all of the zinc and lead contained in the ore by a continuous process which permits uninterrupted operation of all the steps in the process from the charging of the furnace to the recovery of the product.

Furthermore, the process may be practiced under normal operating conditions of a modern reverberatory furnace wherein appreciable variations of temperature are likely to occur from time to time, and does not require a special form of furnace or any radical departure from standard practice with respect to the smelting of the ores or the collection of the product.

In carrying out my invention, I propose to introduce a novel step in the treatment of zinc and lead fumes, which consists in subjecting the fumes to pronounced reducing action under regulated temperature conditions after the fume leaves the furnace but before it enters the usual combustion chamber.

This step in the process has the effect of producing a uniform or standardized product so that any reactions which subsequently occur in the combustion chamber will have the same effect throughout the entire body of fume, and since these particular reactions which occur in the combustion chamber are thoroughly understood, a uniform product of a pre-determined grade may be regularly obtained.

This additional step in the process is preferably carried out in a special chamber or apparatus located to receive the incoming fume from the furnace and to deliver the treated fume to a combustion chamber, which may be of any usual well-known construction and operated according to standard practice.

This chamber, which for convenience of reference I term the reduction chamber, is supplied with a suitable reducing agent, for example, carbon monoxide, in ample quantity to reduce any fume which may have become oxidized or partially oxidized in the atmosphere of the reverberatory furnace to a metallic fume. The reduction chamber is maintained at a high temperature by the reaction taking place between the carbon monoxide introduced in the chamber and the burning of the zinc. If any additional heat is required, it may be supplied from fuel burners communicating with the burning chamber. All of the zinc and lead in the smelter gases is completely reduced owing to the excess of reducing gas and the great heat, and the metal fumes pass into the combustion chamber free from the oxidation in varying degree, which destroys the uniform color of the final product.

In the accompanying drawings I have indicated diagrammatically a form of apparatus suitable for carrying out my process, in which, Fig. 1 indicates a plan view in section of one form of apparatus adapted for the purpose.

Fig. 2 is a diagrammatic side elevation of the apparatus.

In the apparatus shown diagrammatically in the drawings, two reverberatory furnaces A of standard type and construction are shown. The charge may be fed to these furnaces in any desired manner, but I prefer side feeding of the charge if the size and construction of the furnace permits. Both furnaces are connected through suitable passages B with a reduction chamber C, which may be constructed of brick or other heat-resisting material, and of sufficient capacity to hold all of the gases produced by both of the reverberatories for a sufficient period of time during their passage therethrough for the necessary reduction to take place. The reduction chamber is also supplied with a suitable reducing medium, such as carbon monoxide, which enters through the supply pipe D provided with a control valve E. The outlet from the reduction chamber may be controlled by a damper F, and communicates with the usual combustion chamber G, and the flow regulated by the usual suction fan (not shown).

After the fume has been oxidized in the combustion chamber, it passes to the baghouse or settling chamber H, of any well-known construction.

In operation, the ores are smelted at the temperatures usually prevailing in reverberatory practice, for example from 2200 to 2400 degrees F. The greater part of the zinc and the lead passes off as metallic fume, but a considerable percentage may be oxidized, as it is difficult to insure uniform reduction of all of the zinc and lead under the atmospheric conditions prevailing in a reverberatory furnace of modern construction. All of the fume passes with the other gases into the reduction chamber, which is maintained at a temperature at or slightly below the temperature of the reverberatory furnace. This chamber, however, being supplied with a strongly reducing natural or artificial gas from an external source, exercises a powerful reducing action on any fume which may have become oxidized in the reverberatory furnace, and causes all of the fume, including that which has been only partly oxidized as well as the totally oxidized portion to be reduced to the metallic state.

Preferably the reduction chamber is of sufficient size to retain the fume for a period that will insure complete reduction, the rate of travel through the chamber being regulated by manipulation of the damper and the suction fan. As a result, all of the fume is reduced to a uniform condition, and passes into the combustion chamber in a uniform grade or state. The combustion chamber is supplied with air in large quantities to support rapid and complete oxidation of the fume. As all of the inequalities of reaction are eliminated, and the entire reaction in the combustion chamber is under complete control, a pigment of any desired commercial grade may be obtained.

By means of my improved process, all of the variable conditions of a reverberatory furnace which otherwise would deleteriously affect the quality, grade, texture and coloration of the final product are entirely neutralized and overcome. The smelting operation which normally occurs in a reducing atmosphere owing to the amount of fuel added to the charge, is in effect, by my process, transformed into a two-stage operation, wherein the smelting and the reduction of the oxide are carried on in separate chambers or compartments, with but a single charge of fuel. Very little heat is lost in the operation, since the burning chamber may be placed contiguous to the furnace, or it may be separated therefrom a substantial distance. The reducing conditions to which the fume is subjected are thus brought under exact and immediate control, thereby assuring complete elimination of oxidized or partially oxidized particles and the delivery of a uniform product to the combustion chamber, wherein all of the factors which affect the product are likewise under control. Consequently the final product is a pigment of standard grade without coloration that is produced by a continuous process from the fume resulting from the smelting of the ores in a reverberatory furnace.

Having described my invention, what I claim is:

1. In the process which consists in smelting ores containing zinc, lead and other metals in a reverberatory furnace, the steps comprising removing the fumes into a separate chamber, and subjecting the fumes in said chamber to a reducing action while at a high temperature from the heat of the furnace.

2. In the process of producing zinc oxides which consists in smelting ores containing zinc, lead and other metals in a reverberatory furnace, removing the metal fumes out of contact with the ores, and then subjecting the fumes to a reducing atmosphere by adding thereto an excess of reducing gas.

3. The process of forming zinc oxide, which consists in forming in a reverberatory furnace a zinc fume, subjecting said fume to a reducing atmosphere at a high temperature by adding thereto an excess of reducing gas, to reduce oxides formed during smelting, and then oxidizing the fume.

4. The process of producing zinc oxide, which consists in smelting the charge in a reverberatory furnace, removing the fume from the furnace, subjecting the same to a reducing atmosphere without substantially lowering the temperature of the fume to completely reduce it, and then removing the fume and subjecting the same to an oxidizing atmosphere.

5. The process of producing zinc oxide, which consists in smelting zinc ores in a reverberatory furnace to produce a zinc fume, conducting said fume at a relatively high temperature to a separate chamber and mixing a reducing gas therewith in said chamber, and then oxidizing the metallic fume.

6. In the process of producing zinc oxide from zinc fume formed in a reverberatory furnace, the steps of oxidizing and collecting the fume, which consist in removing the fume from the furnace and subjecting the same to reducing action thereby to completely reduce an oxide in the fume, oxidizing the fume in a separate chamber, and collecting the product.

7. The process of preparing zinc oxide from ores containing zinc which consists in smelting the ores in a reverberatory furnace, removing the fume from the presence of the ore and subjecting the same while at a high temperature to the reducing action of carbon monoxide gas to completey reduce the fume and then subjecting the fumes to the action of a combustion chamber having an excess of oxygen therein.

8. The process of treating reverberatory smelter gases containing zinc fume, which consists in subjecting the smelter gas to an excess of carbon monoxide at a high temperature to reduce all of the oxidized zinc particles to a metallic state, and then oxidizing the fume.

Signed at Pueblo, in the county of Pueblo and State of Colorado, this 24th day of July A. D. 1922.

JOHN F. CREGAN.